(No Model.)
J. P. CALLAN.
TWO WHEELED VEHICLE.
No. 381,758. Patented Apr. 24, 1888.
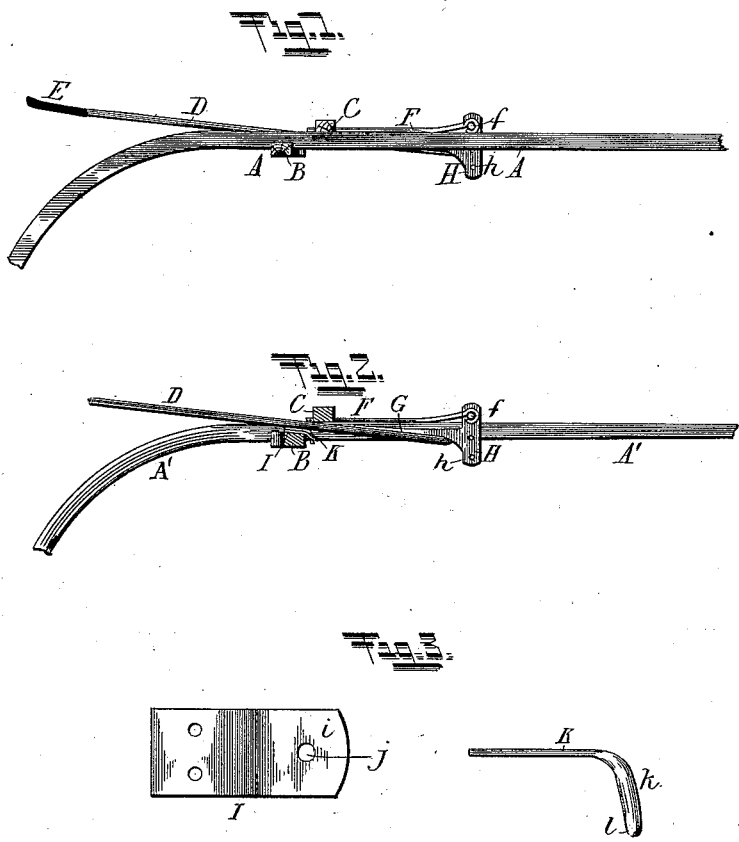
Witnesses.
Will T. Norton
E. W. B. Phillips.
Inventor.
John P. Callan.
By his Attorneys,
John J. Halsted & Son.

UNITED STATES PATENT OFFICE.

JOHN P. CALLAN, OF AURORA, ILLINOIS.

TWO-WHEELED VEHICLE.

SPECIFICATION forming part of Letters Patent No. 381,758, dated April 24, 1888.

Application filed September 24, 1887. Serial No. 250,597. (No model.)

*To all whom it may concern:*

Be it known that I, JOHN P. CALLAN, of Aurora, in the county of Kane and State of Illinois, have invented certain new and useful Improvements in Two-Wheeled Vehicles; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to two-wheeled vehicles; and it consists in a special construction of the supports of the seat, all as more particularly hereinafter described.

In the accompanying drawings, Figure 1 illustrates a side elevation of part of a two-wheeled vehicle with my improvements attached. Fig. 2 is a longitudinal section of the same, and Fig. 3 are details.

A A' represent the shafts of the vehicle; B, the curved or "circle" bar, and C the straight bar for connecting and bracing the shafts.

D D are the two "seat-arms," or the supports for the seat E of the vehicle. These seat-arms pass between the bars B and C, resting upon the curved bar B, and extend about fifteen inches in front of the straight bar C, where they are connected to the shaft A by springs. The seat-arms D D are levers with the bar B forming their bearings or fulcra. Each one of the springs F rests upon a shaft, A, and is secured near one end between the shaft and cross-bar C. The outer end of each of the springs F is free to move. A T-shaped piece of metal is secured by its arm G to each of the seat-arms D, and its cross-arm H has horizontal holes $h$ in it. A bolt, $f$, connects the outer end of the spring F with the metal pieces G H by passing through one of the holes $h$. The object of the T-shaped connection G H and the holes $h$ in the arm H is for the purpose of adjusting the height of the seat to adapt it to horses of different heights.

The seat-arms D D should be always at nearly the same angle with the ground, so as to have the seat E as nearly horizontal as possible, and prevent its tipping backward or forward too much. As a high horse raises and a low horse lowers the shafts and the front ends of the lever seat-arms D, the rear ends of the seat-arms and the seat E will descend or rise respectively. To overcome this difficulty, when the shafts A A are raised by a high horse the forward ends of the seat-arms D are lowered to keep them at the proper angle with the ground, and so as to raise the seat E, and the bolt $f$ is passed through an upper hole, $h$, in the T-shaped pieces G H, (see Fig. 3,) and when the shafts are lowered by a low horse the forward ends of the seat-arms D D are raised to keep them at the proper angle with the ground, and so as to lower the seat E, and the bolt $f$ is passed through one of the lower holes, $h$.

To keep the seat-arms D D in place upon the bar B, and yet to allow plenty of leverage for the seat-arms on said bar, the following devices are used. A small flat plate, I, is secured to the bar D at right angles to the same, and with about one-half of said plate extending forward from the bar and bent a little downward, and in said bent portion $i$ is a hole, $j$. A plate, K, is secured to the under side of the seat-arm D. This plate has its forward portion, $k$, also slightly bent downward to correspond with the portion $i$ of the plate I, and a pin, $l$, forming part of the plate K, projects downward almost vertically, and is adapted to enter the hole $j$ of the plate I. The bent portions $i\ k$ of the plates I K may be slightly curved in a concave direction, as shown in the drawings.

When the seat is weighted, the forward end of the seat-arm will bear up the free end of the spring F away from the shaft, and when the seat is relieved of the weight this spring F will assume its normal position.

I claim—

1. In combination with the bar B, the seat-arms vertically adjustable at the extremities with the forward free ends of springs F, whose rear ends are secured to the shafts, all substantially as shown and described.

2. The combination of the seat-arm having the T-shaped piece upon the forward end and provided with the holes $h$ in the cross-arm of the same, the spring F, and bolt $f$, all substantially as described, and for the purpose set forth.

3. The combination of the plate I, secured to the upper side of the cross-bar B and having the hole $j$, with the plate K, having the pin $l$, and attached to the under side of the seat-arm, all substantially as shown, and for the purpose described.

JOHN P. CALLAN.

Witnesses:
M. O. SOUTHWORTH,
DARIUS PERRY.